(12) United States Patent
Rutz et al.

(10) Patent No.: US 8,221,841 B2
(45) Date of Patent: Jul. 17, 2012

(54) PRE-COATING BURNISHING OF EROSION COATED PARTS

(75) Inventors: David A. Rutz, Glastonbury, CT (US); Monika D. Kinstler, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 64 days.

(21) Appl. No.: 12/561,620

(22) Filed: Sep. 17, 2009

(65) Prior Publication Data

US 2010/0119375 A1 May 13, 2010

Related U.S. Application Data

(63) Continuation of application No. 11/499,163, filed on Aug. 3, 2006, now abandoned.

(51) Int. Cl.
*B05D 3/00* (2006.01)
(52) U.S. Cl. .......................................... 427/327; 427/330
(58) Field of Classification Search .................. 427/327, 427/328
See application file for complete search history.

(56) References Cited

U.S. PATENT DOCUMENTS

| | | | |
|---|---|---|---|
| 3,689,311 A | 9/1972 | Loeffler et al. | |
| 4,585,395 A | 4/1986 | Nourse et al. | |
| 4,904,528 A | 2/1990 | Gupta et al. | |
| 5,476,363 A | 12/1995 | Freling et al. | |
| 5,826,453 A | 10/1998 | Prevey, III | |
| 6,415,486 B1 | 7/2002 | Prevey, III | |
| 6,672,838 B1 | 1/2004 | Crall et al. | |
| 6,893,225 B2 | 5/2005 | Crall et al. | |
| 2002/0136824 A1 | 9/2002 | Gupta et al. | |
| 2005/0155203 A1 | 7/2005 | Prevey | |
| 2005/0158460 A1 | 7/2005 | Williams | |

FOREIGN PATENT DOCUMENTS

| | | |
|---|---|---|
| CN | 2371342 Y | 3/2000 |
| EP | 0844368 A2 | 5/1998 |
| EP | 1236812 A2 | 9/2002 |
| EP | 1662092 A2 | 5/2006 |
| JP | 1-211604 A | 8/1989 |

OTHER PUBLICATIONS

Chinese Office Action for CN200710106476.3, dated Dec. 12, 2008.
Paul S. Prevey et al., Overview of Low Plasticity Burnishing for Mitigation of Fatigue Damage Mechanisms, Proceedings of ICSP 9 (Paper 260), Paris, Marne la Vallee, France, Sep. 6-9, 2005.
Paul S. Prevey et al., Use of Residual Compression in Design to Improve Damage Tolerance in Ti-6Al-4V Aero Engine Blade Dovetails, Proceedings of the 10th National Turbine Engine HCF Conference, New Orleans, LA, Mar. 8-11, 2005.
European Search Report for European Patent Application No. 07252219.6, dated Nov. 16, 2010.

*Primary Examiner* — David Turocy
(74) *Attorney, Agent, or Firm* — Bachman & LaPointe, P.C.

(57) ABSTRACT

A gas turbine engine blade has a platform. A root depends from the platform and an airfoil extends from the platform. The airfoil has leading and trailing edges and pressure and suction sides. The blade has a substrate having a surface. A compressive stress exists below a first region of the surface. The first region extends over a majority of a streamwise perimeter of the airfoil at a location at a spanwise distance from the tip or more than 50% of a tip-to-platform span. A coating is on the surface including at the location.

17 Claims, 2 Drawing Sheets

PRE-COATING BURNISHING OF EROSION COATED PARTS

CROSS-REFERENCE TO RELATED APPLICATION

This is a continuation application of Ser. No. 11/499,163, filed Aug. 3, 2006 now abandoned, and entitled Pre-Coating Burnishing of Erosion Coated Parts, now abandoned, the disclosure of which is incorporated by reference herein in its entirety as if set forth at length.

BACKGROUND OF THE INVENTION

The invention relates to gas turbine engines. More particularly, the invention relates to erosion coated blades.

Compressor blades operating in modern aircraft gas turbine engines are subject to erosion damage. The damage may be caused by ingestion of dirt and sand (e.g., from airport runways). Erosion damage shortens the operating life of blades because of changes in aerodynamic characteristics that reduce performance and reduce fatigue life.

One approach to extending blade life is to apply erosion-resistant coatings such as Co—WC and NiCr—CrC to those areas of the blade airfoil that are subject to the greatest erosion. However, these coatings have a deleterious effect on the fatigue properties of blade substrates, typically titanium and nickel based alloys. Consequently, the erosion coating is only applied to those areas of the airfoil where operating stresses do not exceed the reduced blade fatigue strength. It would be desirable to have ways to mitigate the deleterious effect erosion coatings have on the fatigue properties of the substrate.

SUMMARY OF THE INVENTION

One aspect of the invention involves a gas turbine engine blade. The blade has a platform. A root depends from the platform and an airfoil extends from the platform. The airfoil has leading and trailing edges and pressure and suction sides. The blade has a substrate having a surface. A compressive stress exists below a first region of the surface. The first region extends over a majority of a streamwise perimeter of the airfoil at a location at a spanwise distance from the tip of more than 50% of a local tip-to-platform span. A coating is on at least a portion of the first region of the surface including at the location.

Another aspect of the invention involves a method for making an article of a metallic material. The article comprises a substrate and an erosion coating. An extent of a region of the substrate is selected to be burnished to mitigate a fatigue effect of the coating. A roller deformation is performed on the region, then the coating is applied.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
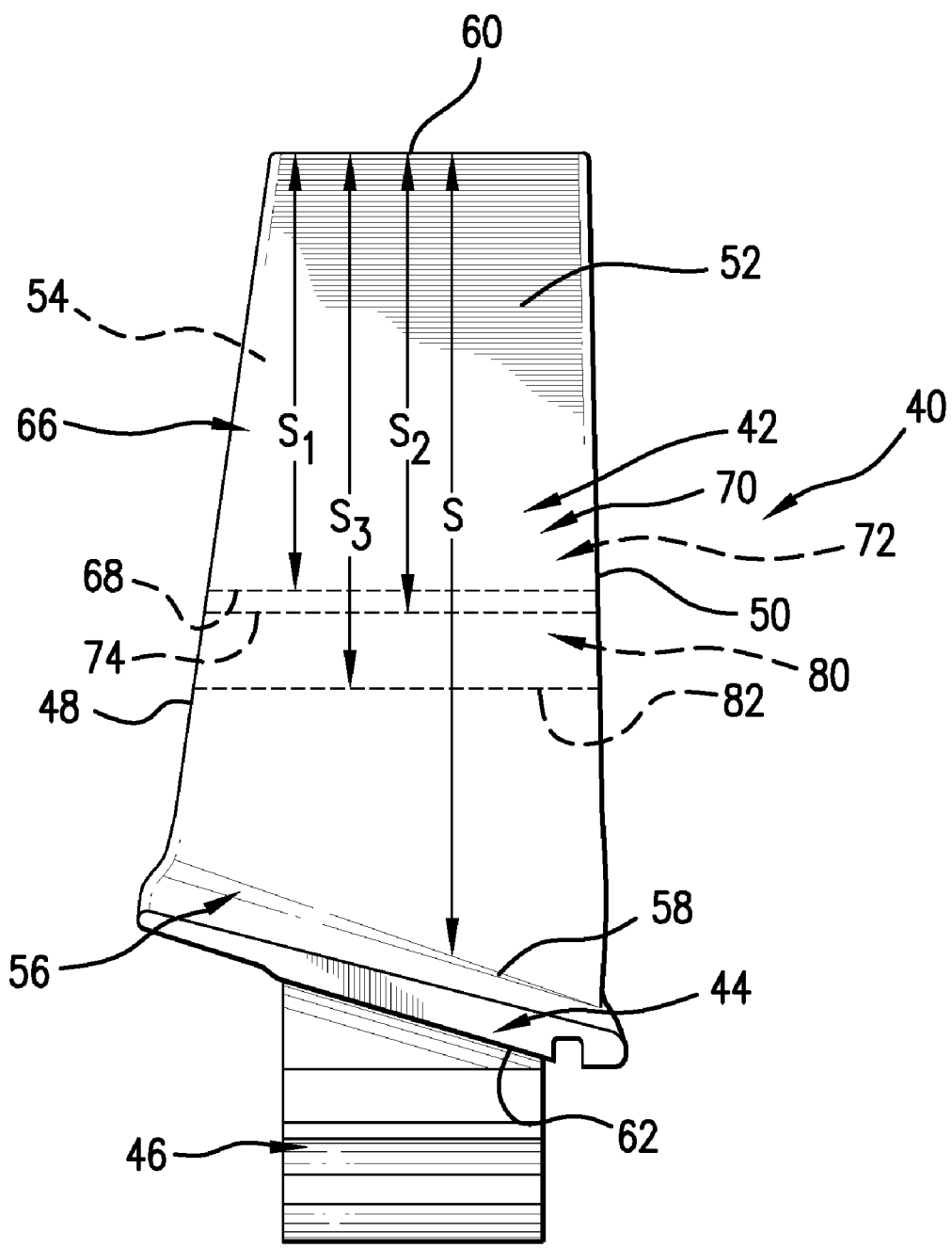
FIG. 1 is a view of a blade.

FIG. 1 shows an exemplary blade 40. The blade has an airfoil 42, a platform 44, and an attachment root 46. The airfoil has a leading edge 48, a trailing edge 50, and pressure and suction sides 52 and 54 extending between the leading and trailing edges. The airfoil extends from an inboard end 56 at the platform outboard surface 58 to an outboard end or tip 60. The root depends from an underside 62 of the platform 44 and may have a convoluted profile (e.g., so-called dovetail or fir tree profiles) for securing the blade 40 to a complementary slot of a disk (not shown). A local span S is the radial distance between the tip 60 and the airfoil inboard end 56. The span S will vary along the airfoil chord.

An exemplary airfoil may be subject to one or more forms of wear and/or damage. Wear may include widely distributed erosion. Damage may include nicks and chips from foreign object damage (FOD), usually near the leading edge 48 or at the tip 60. Erosion typically is concentrated along an outboard portion of the airfoil (e.g., along a zone 66). An exemplary zone 66 extends along a slight majority of the airfoil span along the pressure and suction sides from the tip 60 to boundary 68. Within this zone, the heaviest erosion will typically be along the outboard third of the airfoil (i.e., the third of the airfoil closest to tip 60). The exemplary boundary 68 is a radial distance $S_1$ from the tip. Exemplary $S_1$ is slightly more than 50% of S along the entire chord. The actual extent of erosion damage is influenced by both the airfoil design and the operating characteristics of the engine.

To provide erosion resistance, the metallic blade substrate may have a coating 70 along a zone 72. Exemplary Ti-based substrate alloys include Ti—6Al—4V, Ti—8Al—1Mo—1V, Ti—6Al—2Sn—4Mo—2Zr, Ti—6Al—2Sn—4Mo—6Zr, and Ti—5.5Al—3.5Sn—3Zr—1Nb. Other substrates include, but are not limited to, stainless steels (e.g., 17-4PH) and Ni-base superalloys (e.g., alloy 718). Exemplary coatings include Co—WC, NiCr—CrC, Ti—N, and Ti—AlN. An exemplary zone 72 extends along a majority of the airfoil along the pressure and suction sides from the tip 60 to boundary 74. The exemplary boundary 74 is a radial distance S2 from the tip. Exemplary S2 is more than 50% of S along the entire chord and more than S1. The coating may extend beyond the heaviest erosion areas and provide enhanced foreign object damage.

The coating 70 may have deleterious effects upon blade structural properties (e.g., fatigue properties). Traditionally this has limited use of erosion coatings to areas of the blade airfoil that experience relatively low stresses. According to the present invention, the blade is subjected to a burnishing process to mitigate one or more of these effects and permits coating application over more of the blade airfoil. The exemplary burnishing process is a low plasticity burnishing process.

Low plasticity burnishing of aerospace parts is discussed in U.S. Pat. Nos. 5,826,453, 6,672,838, and 6,893,225 and Published Application No. 2005-0155203. Use of such burnishing for Ti-based parts is also discussed in P. Prevéy, N. Jayaraman, and R. Ravindranath, "Use of Residual Compression in Design to Improve Damage Tolerance in Ti-6Al-4V Aero Engine Blade Dovetails," Proc. 10th Nat. HCF Conf., New Orleans, La., Mar. 8-11, 2005 and P. Prevéy, N. Jayaraman, and J. Cammett, "Overview of Low Plasticity Burnishing for Mitigation of Fatigue Damage Mechanisms," Proceedings of ICSP 9, Paris, Marne la Vallee, France, Sep. 6-9, 2005.

Before erosion coating application, the blade airfoil may be subject to a low plasticity burnishing ("LPB") process along a zone 80. An exemplary zone 80 extends along a majority of the airfoil along the pressure and suction sides from the tip 60 to boundary 82. The exemplary boundary 82 is a radial distance $S_3$ from the tip. Exemplary $S_3$ is more than 50% of S along the entire chord and more than $S_2$ and $S_1$.

Compared with an unburnished blade, the burnishing may allow the coating 70 to be applied over a greater radial span from the tip 60 toward the platform 44. For example, in a prior art process, $S_2$ may be relatively small (e.g., less than $S_1$ and less than 50% of S). For example, blades in models of the CFM56 compressor employ an erosion coating that extends approximately 30-40% of the span from the tip, whereas blades of various other engine families do not use erosion coatings at all.

Although burnishing of tip areas is known, the nature of the present burnishing may have one or more differences relative to that of conventional wisdom in the art. Applied without appropriate consideration of the erosion coating, prior art burnishing may be over a much smaller extent of the airfoil. The prior art may involve a smaller radial span from the tip and may be more localized near the leading edge (to address foreign object damage rather than operating stresses on the blade). The burnishing that addresses foreign object damage (FOD) in uncoated blades is more likely to be deeper than that for use in conjunction with erosion coatings. It may, however, be possible to combine deeper burnishing of tip and/or leading edge portions with shallower burnishing of more proximal and/or trailing/downstream portions.

Figure 2:
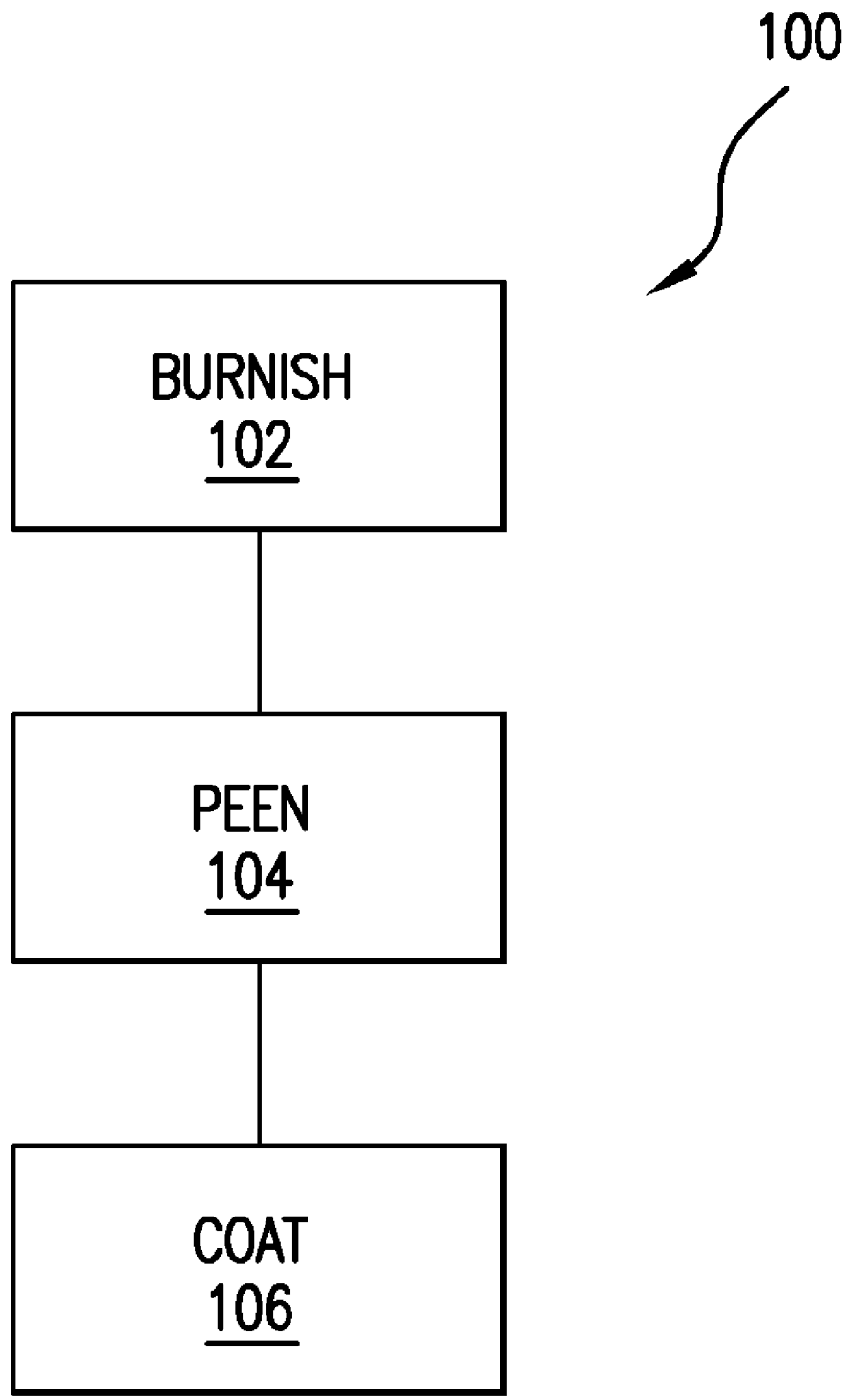
FIG. 2 is a flowchart of a first process for manufacturing or remanufacturing the blade.

FIG. 2 shows an exemplary burnishing and coating process 100. The process may receive a clean blade substrate. The substrate is subjected to a burnishing 102. Exemplary burnishing is by a fluid rolling elements. Exemplary rolling elements are spheres/balls. Single point burnishing and opposed two-point caliper burnishing are disclosed in the references cited above.

The exemplary burnishing 102 is over essentially the entire region to be coated with slight overlap onto the adjacent area of the airfoil. The exemplary burnishing is shallow (i.e., imparting residual compressive stress not extending through the entire thickness/depth of the substrate). An exemplary burnishing imparts a residual compressive stress over a depth zone of up to about 0.015 inch (e.g., more narrowly 0.004-0.008 inch).

An exemplary residual stress in the depth zone has a peak value of 100-110 ksi for Ti-6-4, more broadly 90-120 ksi. The upper end of the range may be limited by the strength of the substrate. Below the depth zone, the residual stress will drop off. Such a shallow depth of stress distribution may limit distortion of the part. In another example, residual stress in alloy 718 blades may approach 150 ksi due to the higher yield strength of this material.

LPB results in significantly less cold work than more traditional processes, such as shot peening. This is of particular relevance in the present use. The Prevéy, et al. references cited above have demonstrated enhanced fatigue properties of LPB after exposure to temperatures as high as 600 C. This becomes significant when one considers the substrate heating associated with compressor blades operating at temperatures exceeding 500 C. Peening stresses tend to diminish with time at intermediate temperatures, thereby negating their beneficial effect. LPB stresses are associated with lower levels of cold work that appear to be more stable at these same temperatures. Thus, LPB is advantageous relative to shot peening in the erosion coating area.

The burnishing parameters needed to provide the desired stress distribution may be developed through an iterative destructive testing process. In an exemplary testing process, a localized inspection process (e.g., x-ray diffraction) may be used to evaluate the depth and magnitude distribution of the residual stress and may indicate the need for altering the burnishing parameters for the location.

In the exemplary method, there may be a further mechanical treatment of the areas of the blade beyond those to be covered by the coating and subject to the burnishing. For example, there may be a shot peening 104. The shot peening may address the attachment root 46. The shot peening may provide a stress distribution that is shallower, but of higher peak compression than the burnishing.

The coating may be applied 106 (e.g., by high velocity oxy-fuel (HVOF) or other high energy thermal spray process, or by physical vapor deposition (PVD)).

One or more embodiments of the present invention have been described. Nevertheless, it will be understood that various modifications may be made without departing from the spirit and scope of the invention. For example, the invention may be implemented as a modification of or using various existing coating, burnishing, and other techniques and apparatus. Also, various boundary and transition areas may have properties departing from those discussed above. Although illustrated as applied to a blade airfoil, the erosion coatings may be on other areas and other components. Accordingly, other embodiments are within the scope of the following claims.

What is claimed is:

1. A method for manufacturing a coated part comprising:
   burnishing a first surface of a metallic substrate to provide a first residual stress distribution; and
   applying a coating to at least a portion of said first surface, wherein the coated part is a gas turbine engine blade comprising:
   a platform;
   a root depending from the platform;
   an airfoil having:
      a leading edge and a trailing edge; and
      a pressure side and a suction side,
   wherein the blade comprises:
      said substrate;
      a compressive stress below a first region of the first surface, the first region extending over a majority of a streamwise perimeter of the airfoil at a location at a spanwise distance from the tip of more than 50% of a local tip-to-platform span; and
      said coating on at least a portion of the first region of the surface, the portion including said location, and
   wherein:
      the burnishing has an inboard boundary; and
      the coating is applied over a coating region having an inboard boundary outboard of the inboard boundary of the burnished continuous region.

2. The method of claim 1 wherein:
   said first region includes a majority of a span along the leading edge.

3. The method of claim 1 wherein:
   the coating is over essentially an entirety of the first region.

4. The method of claim 1 wherein:
   the first region extends over essentially an entirety of the airfoil outboard of the location.

5. The method of claim 1 wherein:
   the coating comprises at least one of Co—WC and NiCr—CrC.

6. The method of claim 1 wherein:
   the blade is a compressor blade.

7. A method of making an article of a metallic material, the article comprising a substrate and an erosion coating, the method comprising:
- selecting an extent of a region of the substrate to be burnished to mitigate a fatigue effect of the coating, the region being along an airfoil and extending to an inboard half of the airfoil;
- performing roller deformation on the region; and
- applying the coating, wherein:
- the roller deformation has an inboard boundary; and
- the coating is applied over a coating region having an inboard boundary outboard of the inboard boundary of the roller deformed continuous region.

8. The method of claim 7 wherein:
the region is larger than a region to which the coating is applied.

9. A method for manufacturing a coated part comprising:
- burnishing a first surface of a metallic substrate to provide a first residual stress distribution, the burnishing including burnishing a continuous region from a tip of a blade airfoil to a location in an inboard half of a span of the airfoil; and
- applying a coating to at least a portion of said first surface, wherein:
- the burnishing has an inboard boundary; and
- the coating is applied over a coating region having an inboard boundary outboard of the inboard boundary of the burnished continuous region.

10. The method of claim 9 wherein the coating comprises at least one of:
Co—WC; and
NiCr—CrC.

11. The method of claim 9 wherein:
an alternative second residual stress distribution provides:
- greater fatigue resistance for the uncoated substrate than does the first residual stress distribution; and
- lesser fatigue resistance for the coated substrate than does the first residual stress distribution.

12. The method of claim 11 wherein:
the first residual stress distribution provides a residual compressive stress extending over a greater area than a residual compressive stress of said second residual stress distribution.

13. The method of claim 9 further comprising:
peening the substrate.

14. The method of claim 9 further comprising:
peening the substrate, the peening after the burnishing and non-overlapping.

15. The method of claim 9 wherein:
the burnishing is a low plasticity fluid roller burnishing.

16. The method of claim 9 wherein:
along a majority of a surface area of the continuous region, the burnishing imparts compressive stress to a depth of 0.004-0.008 inch.

17. The method of claim 9 wherein:
along a majority of a surface area of the continuous region, the burnishing imparts compressive stress to a depth not exceeding 0.015 inch.

* * * * *